Aug. 28, 1951　　　　H. NELSON　　　　2,565,983
CORD STOP APPLYING MACHINE
Filed Aug. 13, 1946　　　　　　　　　　5 Sheets-Sheet 3

INVENTOR
HARRY NELSON
BY
Ramsey, Kent & Chisholm
HIS ATTORNEYS

Aug. 28, 1951

H. NELSON 2,565,983

CORD STOP APPLYING MACHINE

Filed Aug. 13, 1946

INVENTOR
HARRY NELSON
BY
Ramsey, Kent + Chisholm
HIS ATTORNEYS

Aug. 28, 1951  H. NELSON  2,565,983
CORD STOP APPLYING MACHINE
Filed Aug. 13, 1946  5 Sheets-Sheet 5

INVENTOR
HARRY NELSON
BY
Ramsey, Kent & Chisholm
HIS ATTORNEYS

Patented Aug. 28, 1951

2,565,983

UNITED STATES PATENT OFFICE 2,565,983

CORD STOP APPLYING MACHINE

Harry Nelson, New York, N. Y., assignor to Lorentzen Hardware Mf'g. Corp., New York, N. Y., a corporation of New York Application August 13, 1946, Serial No. 690,287

4 Claims. (Cl. 153—1)

This invention relates to the application of stops or beads to a cord, and it particularly contemplates a machine for applying stops to a Venetian blind tilt cord.

Venetian blinds customarily employ slat-tilting mechanism, known as a "tilter," to vary the inclination of the slats; and the tilter is usually actuated by a tilt cord reeved over a pulley. In so-called "escapement" or "self-adjusting" tilters, such as disclosed in Nelson Patent 2,174,994, October 3, 1939, the pulley rotates idly at times and the cord is provided with stops to limit the movement of the cord. Two stops are provided on the cord, one for cord movement in one direction and the other for cord movement in the opposite direction; and the stops, by engaging respective stationary loops or rings through which the cord passes, limit the movement of the cord.

The provision of stops on the tilt cord has presented considerable practical and commercial difficulty, including expense of the stops, expense of applying them, tendency of the stops to slip on the cord, tendency of the stop to kink or deform the cord as it is applied, difficulty of speedily locating two stops at the required spacing on the cord, and difficulty in expeditiously and economically applying the stops in a satisfactory manner.

The general object of the present invention is to ameliorate the foregoing difficulties and to endeavor to eliminate them; and I have found that this can be accomplished by the use of cooperating dies and punches for deforming U-shaped drawn sheet metal stops so as to shape them into smoothly rounded stops or beads surrounding and firmly engaging the cord so as to resist displacement, suitable stop-spacing means being provided to locate the two stops at the desired spacing.

A more specific object of the present invention is to provide a machine for quickly and accurately applying stops to a cord.

Another object is to eliminate kinking or deformation of the cord adjacent to the stop.

A further object of the invention is to provide a machine that will apply stops to a cord with a predetermined cord length therebetween.

Another object is to provide a machine of the foregoing type in which the cord and the stop are quickly and easily positioned for the attaching operation.

A further object is to provide a machine that will apply two stops simultaneously.

Further objects, and objects relating to details and economies of construction and use will more definitely appear from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 5 is an enlarged detailed sectional view of the punch, die, and associated parts in stop-applying position.

Figure 1:
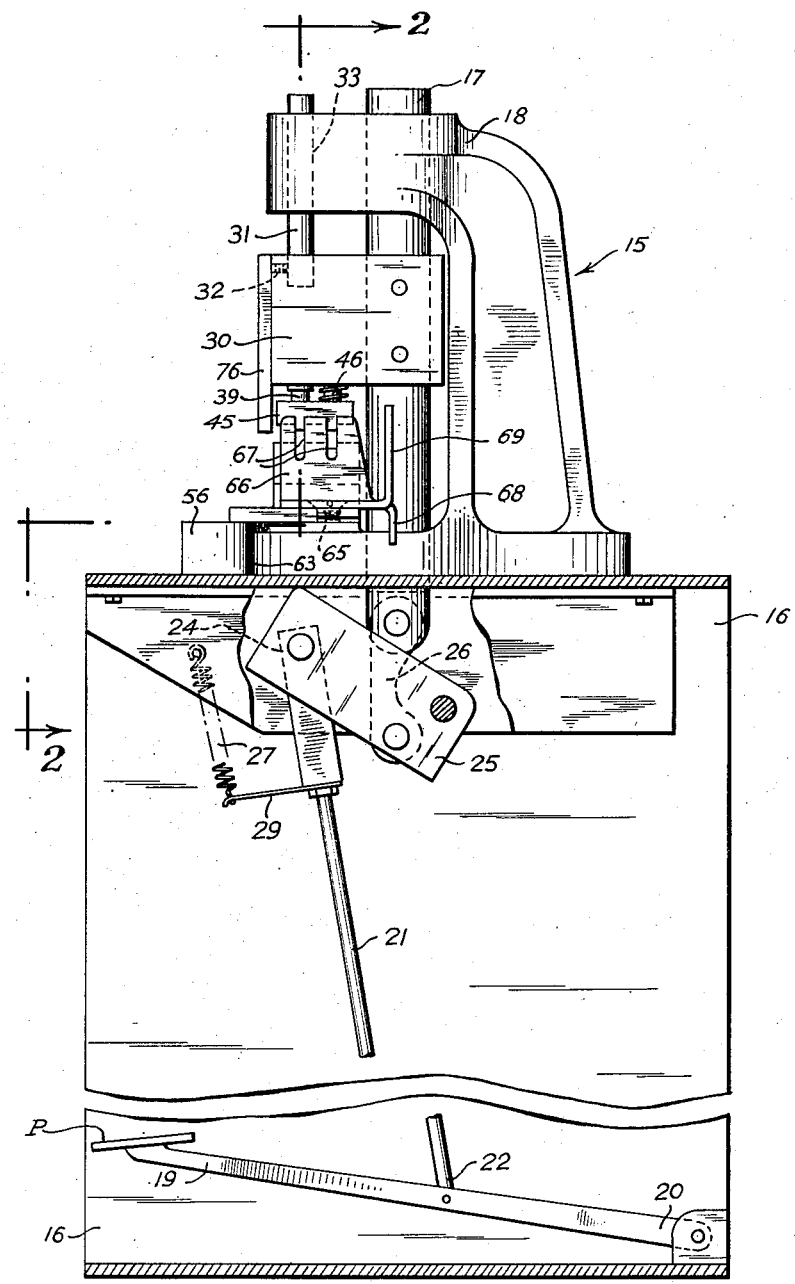
Fig. 1 is a side elevation of the machine, a portion of the framework being shown in cross section.
Figure 4:
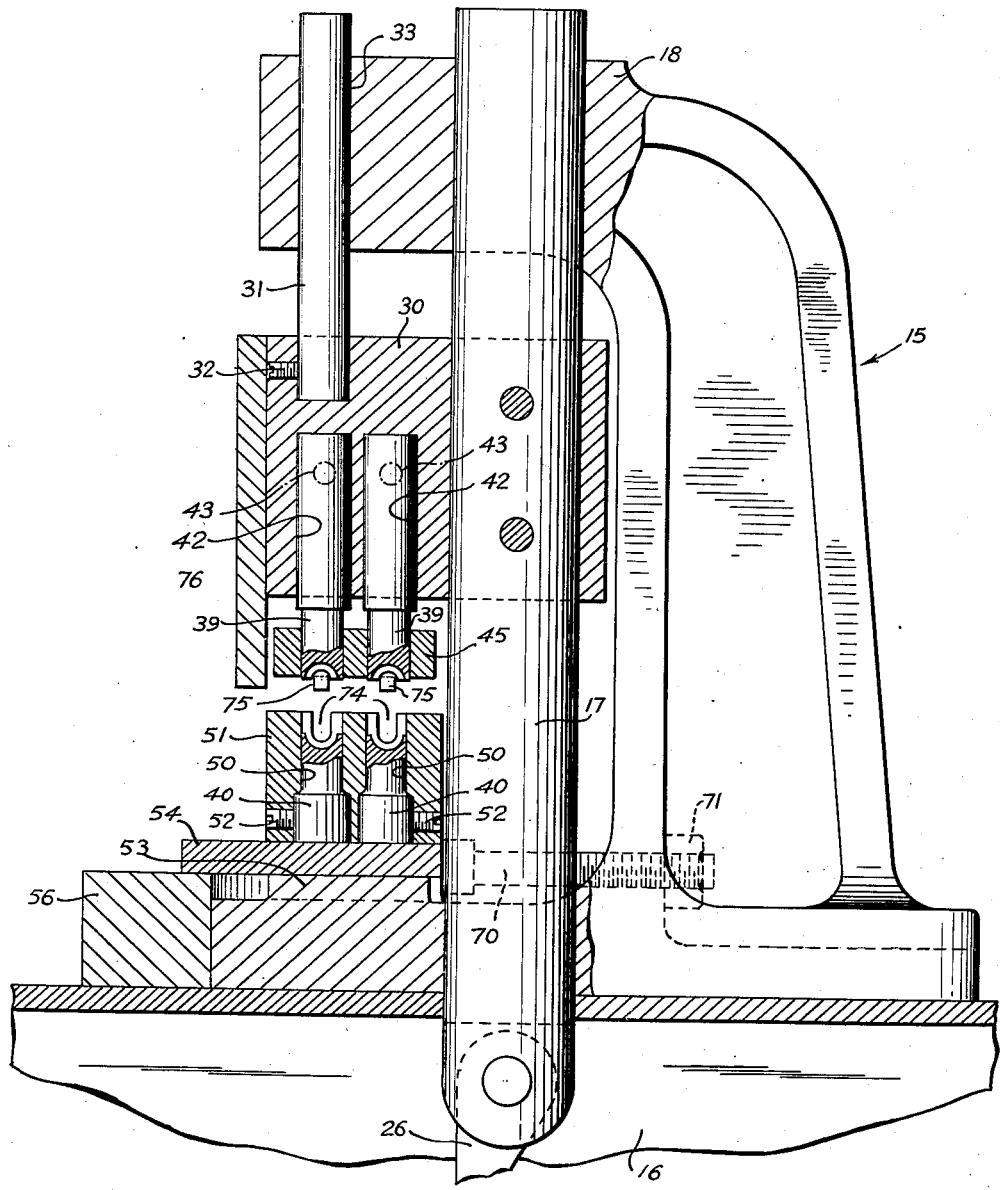
Fig. 4 is a vertical section taken in general on the line 4—4 of Fig. 3.

Referring to Figs. 1 and 4, the machine comprises a press generally indicated as 15 which is mounted on a supporting framework 16. The press 15 has a frame 18 in which a plunger 17 is mounted for reciprocatory vertical motion, the plunger projecting downwardly into the framework 16.

Linkage is provided for reciprocating the plunger 17, this linkage comprising, in part, a pedal-actuated lever 19 which is adapted to be depressed by the machine operator and which is pivoted at the rear end 20 thereof to the framework 16. An upwardly projecting rod 21 is pivotally connected at its lower end 22 to the pedal lever 19 between its ends and is pivotally connected at its upper end 24 to the end of a lever 25, the opposite end of the lever 25 being pivoted to the framework 16. A link 26 has one end pivotally connected to the lower end of the plunger 17 and the other end pivotally connected to the lever 25 between the ends thereof. A tension helical spring 27 has its lower end connected with a projecting arm 29 rigidly mounted on the rod 21, the spring extending upwardly and having its upper end secured to the framework 16. The linkage just described so compounds leverage as to greatly amplify the force as it is transmitted from pedal P to the plunger 17. The spring 27 serves to return the pedal-lever 19 and plunger 17 to the normal raised position.

The plunger 17 has a punch block 30 secured thereto between its journalled portions, the punch block projecting towards the front of the machine. A guide pin 31 is secured in the top of the punch block 30 by a set screw 32 and is reciprocatably received in a bore 33 in the frame 18, the guide pin 31 being parallel with the plunger 17 and serving to prevent lateral movement of the punch block 30 as well as facilitating the reciprocation of the plunger.

Figure 6:
Fig. 6 shows a length of a cord with two stops applied thereto.

Before proceeding further with a description of the machine, the stop which the machine is to apply will be described inasmuch as the detailed construction of the machine can be better understood if considered with the construction of the stop in mind. Fig. 6 illustrates a cord 34 having two stops 35, 35 attached thereto, the term "cord" including cord, string, rope or the like, and the term "stop" meaning any stop or bead attached to a cord to engage a member positioned around or adjacent to the cord.

Figure 7:
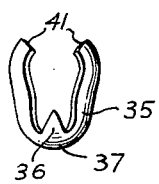
Fig. 7 is an end elevation of a stop before application to the cord.
Figure 8:
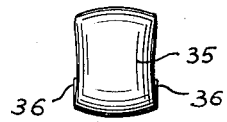
Fig. 8 is a side elevation of the stop shown in Fig. 7.
Figure 9:
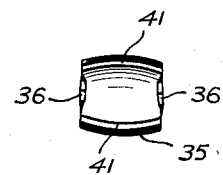
Fig. 9 is a top plan view of the stop shown in Figs. 7 and 8.

The stop 35 is preferably formed of drawn or stamped sheet metal, being outwardly dished and of generally U-shaped contour as viewed in Fig. 7. A pair of prongs 36, 36 project upwardly at each side from the base of the U-section or closed end of the stop in order to penetrate the cord 34 upon the stop being secured thereon, so as to resist displacement of the stop along the cord. The lower portion 37 of the stop 35 has a generally spherical surface which is not materially altered during the attaching operation.

Figure 10:
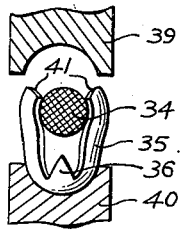
Fig. 10 is a somewhat diagrammatic view of a stop and cord in position for applying the stop, the punch and die being indicated.
Figure 11:
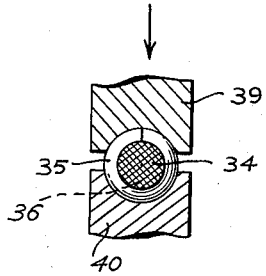
Fig. 11 is a somewhat diagrammatic view of the stop in applied position about the cord, the punch and die being indicated.
Figure 12:
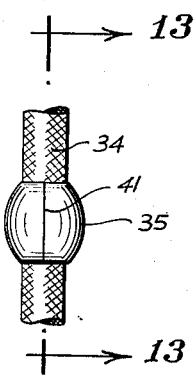
Fig. 12 is an elevation of the stop in applied position on the cord.
Figure 13:
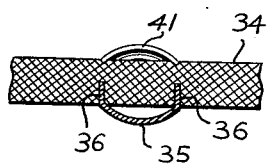
Fig. 13 is a longitudinal section of the stop positioned on the cord, taken on the line 13—13 of Fig. 12.

As indicated in Figs. 10 and 11, the attaching operation is accomplished by forcing together a punch 39 and die 40, the punch and die both being generally cup-shaped as will be explained more completely in the following description. The punch 39 has an additional means acting therewith, not shown in Fig. 10 but shown in Figs. 2 and 4 which will be described later, for forcing the cord 34 to the bottom of the stop 35 as the punch descends. As the punch 39 descends onto the die 40, it rounds the stop 35 from its U-shaped cross section to the circular cross section shown in Fig. 11, the free edges 41, 41 of the stop 35 being brought into abutting smooth-line relationship and the outer surface of the stop being molded into a symmetrically curved surface of revolution, as shown in Figs. 12 and 13.

The nature and attachment of the stop 35 on the cord 34 having been described, the particular construction of the machine will be continued, reference being had to Figs. 2-5. In order to apply two stops 35 simultaneously, two punches 39, 39 and two dies 40, 40 are provided. The two punches 39, 39 are secured in recesses 42, 42 in the punch block 30 by set screws 43, 43. A clamping bar 45 is supported underneath and spaced from the punch block 30, the clamping bar being pierced by the lower ends of the punches 39, 39 and being supported by two bolts 46, 46 positioned for axial movement in vertical bores 47, 47 in the punch block 30, the heads of the bolts limiting the downward movement of the bolts in the bores and the lower ends of the bolts being threadedly engaged in the clamping bar. Helical springs 49, 49 surround the lower portions of the bolts 46, 46 and are positioned between the punch block 30 and the clamping bar 45, a portion of these springs being contained in the enlarged lower ends of the bores 47, 47 whereby the clamping bar is resiliently mounted on the punch block.

The dies 40, 40 are retained in bores 50, 50 in a die holder 51, the spacing of the dies corresponding to the spacing of the punches 39, 39.

Figure 2:
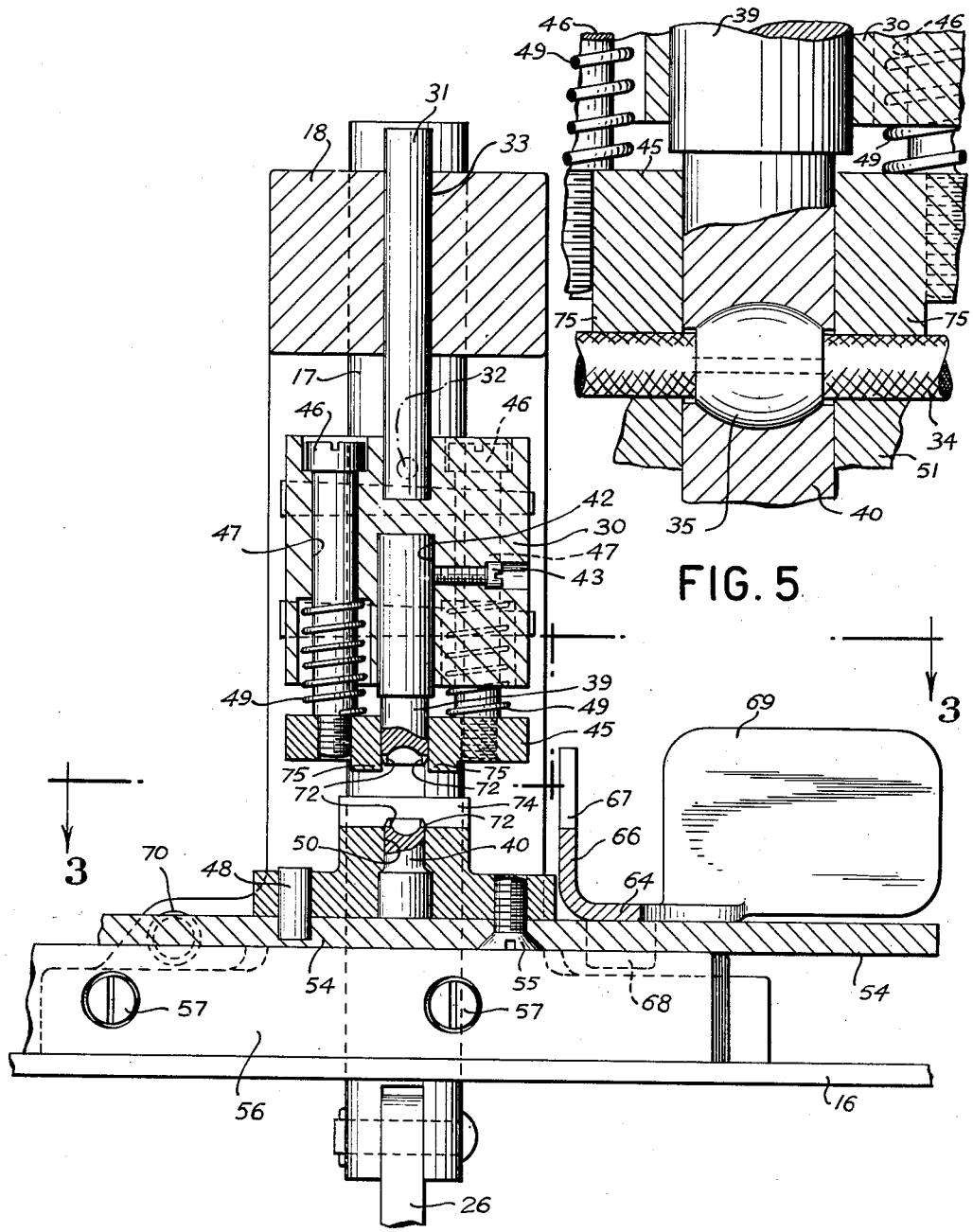
Fig. 2 is an enlarged vertical cross section of the upper portion of the machine taken in general on the line 2—2 of Fig. 1.
Figure 3:
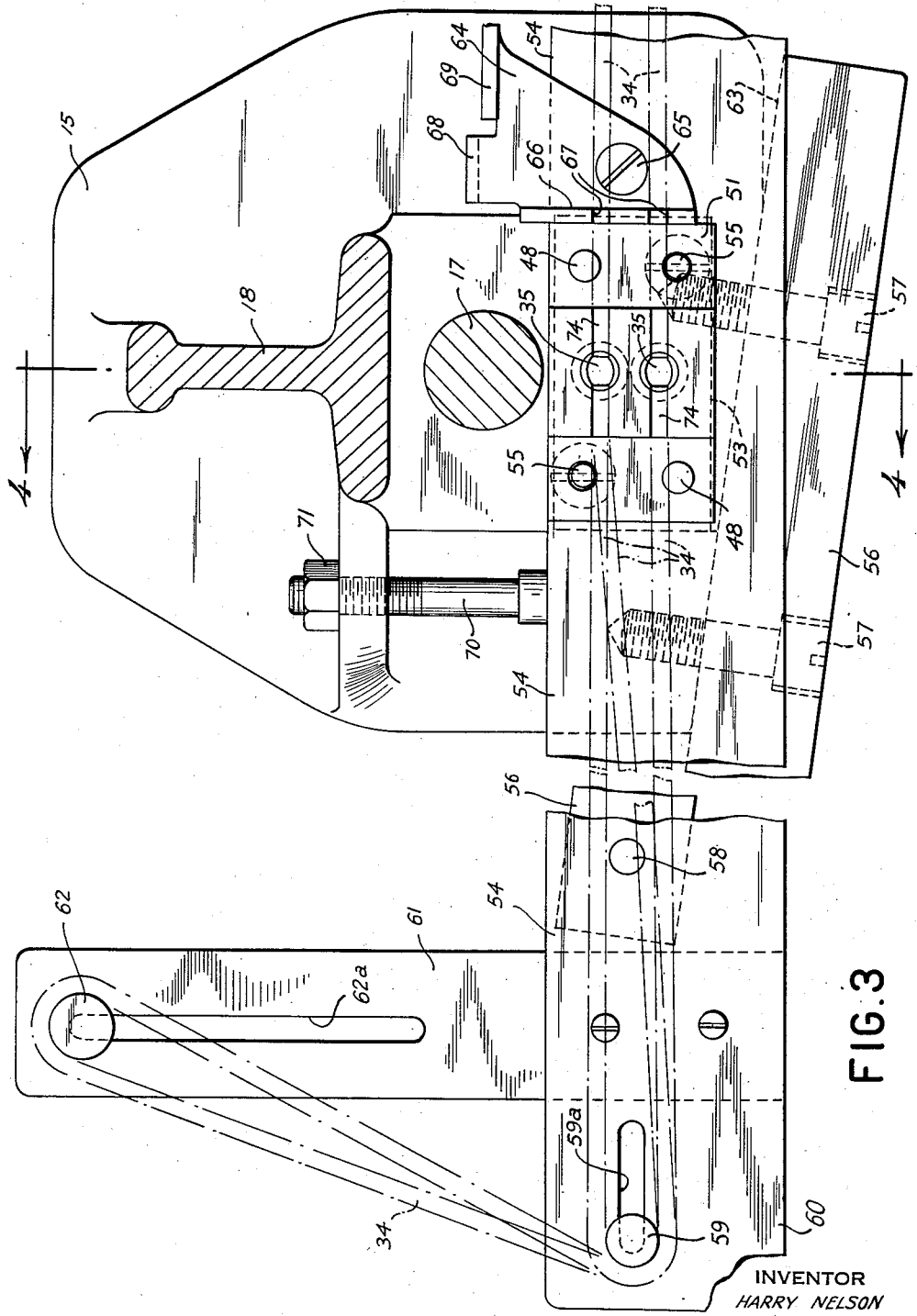
Fig. 3 is a horizontal section of the upper portion of the machine taken in general on the line 3—3 of Fig. 2.

The dies 40, 40 may be retained in the die holder 51 by set screws 52, 52 (Fig. 4). Referring to Figs. 2, 3 and 4, the die holder 51 is mounted on top of a die shifting bar 54 which is preferably composed of a plate of rectangular cross section which extends to the left of the machine as viewed in Fig. 3. Bolts 55, 55 and locating pins 48, 48 serve to secure die holder 51 in position on the die shifting bar 54.

The die shifting bar 54 is pivotally attached to the left end of a stationary shifting bar support 56 by a pivot 58. The shifting bar support 56, which is forwardly inclined, is secured to the base of the press frame 18 by a pair of bolts 57, 57. The arrangement is such that the die shifting bar 54 may be oscillated forwardly and backwardly to move the dies 40, 40 from under the punches 39, 39. The portion 53 (Fig. 4) of the base of the frame 18 beneath the die shifting bar 54 serves as a firm base for supporting the shifting bar during the stop-applying operation; and when the bar 54 is shifted forwardly it is supported by member 56.

The die shifting bar 54 is extended to the left as viewed in Fig. 3 beyond the pivot 58. An upwardly projecting boss 59 is mounted at the extreme end portion 60 of the die shifting bar 54, the distance from one die 40 to and around the boss 50 and back to the other die 40 being equal to one standardized spacing on the cord 34 at which it is desired to secure the stops 35. Thus, the cord 34 may be passed around the boss 59 and extended through the dies 40, 40 for application of stops 35, 35.

A bracket arm 61 may be mounted on the die shifting bar 54 so as to project towards the rear of the machine and a boss 62 mounted at the upper end of the arm 61. The distance from one die 40, around boss 59, thence around boss 62 and back to boss 59, and thence to the other die 40 is equal to a second (and greater) standardized spacing on a cord 34 at which it may be desired to apply stops 35, 35. To apply stops at this increased spacing, the cord 34 is looped as just indicated.

By making bosses 59 and 62 adjustable as to position, the machine may be adapted to provide continuous variation of the spacing interval of the stops. For this purpose conventional pin-and-slot connections may be used, the bosses 59 and 62 being equipped with threaded studs which pierce slots 59a and 62a, respectively, winged nuts or the like being used to clamp the stops in any adjusted position. To facilitate adjustment, any suitable scale or indica may be marked along the slots. However, if only two standardized intervals of stop-spacing are desired, I prefer to mount bosses 59 and 62 in fixed position so as to relieve the operator of the burden of making and checking adjustments.

A cord guide bracket 64 may be secured to the die shifting bar 54 adjacent the die holder 51 by a screw 65 passing through the bracket and threadedly engaged in the shifting bar. The bracket 64 is provided with an upstanding flange 66 having two notches 67, 67 extending vertically and in line with the dies 40, 40, the notches serving to maintain the cord in stop-applying position with respect to the dies. The cord guide bracket 64 is also provided with a downwardly projecting flange 68 for limiting outward movement of the die shifting bar 54 by engagement with the inner face 63 of the shifting bar support 56, as well as with an upwardly projecting flange 69 serving as a handle to be manually moved by the operator to oscillate the die shifting bar.

A bolt 70, threadedly engaged in a portion of the frame 18, serves as an adjustable stop to position the dies 40, 40 directly beneath the punches 39, 39 when they are swung in preparatory to the stop-applying operation. A nut 71 serves to lock the bolt 70 against accidental displacement. The bolt 70 is so adjusted that when the die shifting bar 54 positions the dies 40, 40 directly beneath the punches 39, 39, the shifting bar will rest against the bolt, as shown in Fig. 3.

The work-engaging portions of the punches 39, 39 and the dies 40, 40 are similar, each of the mating punches and dies being generally cup-shaped and having a surface corresponding to the desired outer surface of the stop 35, this surface being a surface of revolution about the longitudinal axis of the cord. In addition, each punch 39 and die 40 has a pair of oppositely-positioned semicircular notches 72, 72 (Fig. 2) of proper width to receive the cord 34, so that, upon closing of the punch upon the die, the cord will not be deformed. The punches 39 and dies 40 are rotatively so positioned before being secured by their set screws that the several notches 72 will be alined in proper position for receiving the cord 34 which extends past the dies in the direction indicated in Fig. 3.

It will be noted from Fig. 4 that the forming surfaces of the dies 40, 40 are positioned somewhat below the top surface of the die holder 51. The die holder 51 has a pair of parallel slots 74, 74 extending across the top surface and cross axially intersecting the bores 50, 50 which receive the dies 40, 40. The slots 74, 74 are of proper width, depth and position to receive the cord 34 extending as indicated in Fig. 3, these slots alining the cord in proper position across the dies 40, 40. In addition, projections 75, 75, extending downwardly from the clamping bar 45 on both sides of the punches 39, 39, are so shaped and positioned as to pass within the slots 74, 74. The projections 75, 75 force the cord 34 downwardly in the stops 35, substantially to the bottom of the U-formation of the stops, and they also clamp the cord in the bottom of slots 74, 74 prior to the engagement of the punches 39, 39 with the stops 35, 35.

A downwardly projecting plate 76 (Figs. 1 and 4), secured to the front face of the punch block 30, serves as a guard to protect the machine operator in case of fracture of any of the parts during the stop-applying operation.

In the operation of the machine just described, a stop 35 is inserted in each of the dies 40, 40, the bend of the U-formation of the stop being placed at the bottom and the open sides of the stop being alined with the slots 74, 74. A looped length of cord 34 is then placed with the two branches thereof extending through the slots 74, 74 and thence through the notches 67, 67 in the cord guide bracket 64, the bight of the cord 34 being passed about the boss 59 or the boss 62 according to the spacing of the stops desired. With his right hand the operator holds the cord against the bottoms of notches 67, 67 and draws the cord reasonably taut, holding it so until the stops have been applied. The die shifting bar, which was preferably shifted forwardly away from the punches 39, 39 for the insertion of the stops and the cord, is now pushed rearwardly by the operator, bringing the dies 40, 40 in alinement with the punches 39, 39. The operator then depresses pedal P, forcing the punch block 30 downwardly by means of the linkage described, and thereby forcing the clamping bar 45 and the punches 39, 39 downwardly. Prior to engagement of the punches 39, 39 with the stops 35, 35, the projections 75, 75 on the clamping bar 45 enters the slots 74, 74 in the die holder 51, thereby forcing the cord 34 downwardly in the stops 35, 35 and clamping the cord 34 against displacement. This clamping action exerted on the cord 34 serves to drive the cord to the bottoms of the U-formation of the stop 35, 35 and then to keep the cord lying flat during the molding of the stops so that the cord is not permanently kinked or distorted and will hang normally when in use on a Venetian blind.

As the punch block 30 continues downwardly, the springs 49, 49 yield, permitting the clamping bar 45 to remain stationary in clamping position while the punches 39, 39 continue their downward stroke to mold the stops about the cord. The molding action causes the stops 35, 35 to become tightly clenched about the cord 34, the outer surface of each stop being deformed by the punch and die to a smooth continuous surface of revolution. In its lowermost position, each punch has progressed to within approximately one-thirty-second of an inch of its mating die. Upon release of pressure on the pedal P the punch block rises, raising the punches 39, 39. As the punches rise they withdraw through the clamping bar 45, thus stripping the molded stops from the punches should they tend to adhere thereto.

After the punch block has reached its upper position, the die shifting bar 54 may be oscillated to forward position and the cord 34, with stops 35 applied in properly spaced position, may be removed from the machine, after which the cycle may be repeated.

From the foregoing description, it will be noted that this machine will quickly and easily apply stops at predetermined intervals along a cord and without deformation of the cord adjacent the stops.

I claim:

1. A machine for clenching a rounded, generally U-shaped sheet metal stop about a cord, said machine comprising: a die for receiving the closed end of the stop, cord-receiving means mounted closely adjacent the die and having a channel in alignment with the die and extending from opposite sides of the die for receiving a cord in straight-line position for clenching of the cord stop thereon, a punch mounted for movement towards the die to clench the stop about the cord, cord-clamping elements positioned on opposite sides of the punch and movable towards the channel, and means for moving said elements into resilient clamping engagement with the cord within the channel on opposite sides of, and close to, the die to clamp the cord before and during clenching of the stop, said latter means also moving the punch towards the die to clench the stop about the cord.

2. A machine as claimed in claim 1, in which the punch is carried by the punch block of a press, the punch block being mounted for reciprocatory movement, and the cord-clamping elements being carried on a member resiliently supported from the punch block for displacement relative to the punch.

3. A machine as claimed in claim 2 in which a second and similar die, punch, cord-receiving means, and cord-clamping elements are mounted beside the first die and punch and operated simultaneously therewith for simultaneously clenching a second stop on a Venetian blind tilt cord, and a projection is located a predetermined distance from the dies to receive a bight of said cord.

4. A machine as claimed in claim 3 in which the two dies and cord-receiving means are mounted on a member pivoted for horizontal swinging movement forwardly from beneath the punches to facilitate placing the cord stops and cord within the dies.

HARRY NELSON.

REFERENCES CITED

The following references are of record in the file of this patent:

UNITED STATES PATENTS

| Number | Name | Date |
| --- | --- | --- |
| 308,087 | McDonald | Nov. 18, 1884 |
| 979,168 | Joslin et al. | Dec. 20, 1910 |
| 1,107,758 | Christy | Aug. 18, 1914 |
| 1,348,336 | Tomkins | Aug. 3, 1920 |
| 1,412,086 | Norden | Apr. 11, 1922 |
| 1,507,916 | Granat | Sept. 9, 1924 |
| 1,743,364 | Liss | Jan. 14, 1930 |
| 1,765,521 | Barrans | June 24, 1930 |
| 1,944,251 | Mansbendel | Jan. 23, 1934 |
| 2,304,582 | Lyon | Dec. 8, 1942 |